United States Patent

Roever et al.

[15] 3,699,207

[45] Oct. 17, 1972

[54] PROCESS FOR THE PURIFICATION OF CADMIUM SOLUTIONS

[72] Inventors: Wilhelm Roever; Helmut Junghanss, both of Duisburg; Hans-Werner Kauczor, Leverkusen, both of Germany

[73] Assignee: Farbenfabriken Bayer Aktiengesellschaft, Leverkusen, Germany

[22] Filed: May 27, 1970

[21] Appl. No.: 41,052

[30] Foreign Application Priority Data

July 11, 1969 Germany..........P 19 29 661.8

[52] U.S. Cl. ......................423/100, 75/117, 75/118, 75/119, 75/120, 75/121, 75/101 BE, 23/312 R
[51] Int. Cl. ............................................C22b 17/04
[58] Field of Search ......75/121, 101 BE, 101 R, 120, 75/119, 118, 117; 23/50 BE, 312 R

[56] References Cited

UNITED STATES PATENTS

| | | |
|---|---|---|
| 3,441,372 | 4/1969 | Pegler et al...............75/121 X |
| 2,980,607 | 4/1961 | Mock et al. ......75/101 BE UX |
| 3,532,490 | 10/1970 | Burkin ..................75/101 R X |
| 3,305,306 | 2/1967 | Morawe et al..................23/97 |
| 3,180,812 | 4/1965 | Beau........................75/121 X |

*Primary Examiner*—G. T. Ozaki
*Attorney*—Connolly and Hutz

[57] ABSTRACT

Process for producing cadmium solutions wherein said solution is contacted with a cation exchanger containing amino carboxylic- or imino carboxylic acid groups and wherein the ion exchanger is separated from the cadmium solution after having absorbed accompanying metals from said cadmium solution.

7 Claims, No Drawings

PROCESS FOR THE PURIFICATION OF CADMIUM SOLUTIONS

The present invention relates to a process for the purification of cadmium solutions which are obtained in the wet processing of cementates from zinc liquor purification, flue dust or other substances which contain cadmium.

In the recovery of cadmium by wet metallurgical processes, for example from flue dusts, cementates from zinc liquor purification or other cadmium containing substances, the cadmium containing solution is freed from the accompanying metals prior to the recovery of cadmium. These accompanying metals, e.g., zinc, thallium, indium, copper, nickel and cobalt, are often only contained in small quantities in the solutions and must be removed, e.g., for the purpose of electrolytic cadmium deposition, by conventional processes which generally consist of several stages of cementation and precipitation followed by filtration.

It has now been found that the removal of the accompanying metals from solutions which contain cadmium can easily by carried out on certain ion exchangers and surprisingly even if cadmium is present in a large excess. The process is characterized in that the cadmium containing solution is contacted with a cation exchanger which contains aminocarboxylic acid or iminocarboxylic acid groups as the active exchange groups, and after absorption by the cation exchanger of the accompanying metals which are more firmly bound than cadmium, the cadmium solution is again separated from the ion exchanger and the metals absorbed by the cation exchanger are subsequently eluted therefrom.

In these exchanger resins, which will hereinafter be referred to as complexon resins, the internal complex cation bond varies in its stability towards different metals.

Thus, for example, the following metals are more firmly bound than cadmium, the strength with which they are bound increasing with their position in the given sequence:

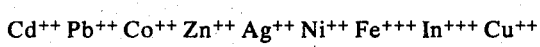

$Cd^{++} Pb^{++} Co^{++} Zn^{++} Ag^{++} Ni^{++} Fe^{+++} In^{+++} Cu^{++}$

At the beginning of the process of charging the exchanger resin, which is advantageously present in the form of its alkali metal or alkaline earth metal salt, the cations of all the metals contained in the solution are absorbed. Thereafter, as the resin is contacted with the solution, e.g., using the column process with solution flowing through it, the cadmium ions initially absorbed on the resin are displaced by the cations of those accompanying metals in the cadmium solution which form a more stable bond. Within the meaning of the invention, cadmium solutions are understood to mean aqueous cadmium salt solutions, preferably cadmium sulphate or cadmium chloride solutions, which contain accompanying metals as impurities. Owing to the strong tendency of cadmium to form stable chloro complex anions, chloride solutions favor the separation of accompanying metals according to the invention since the concentration of cadmium cations in the solution is reduced by the chloro complex formation.

It has surprisingly been found that by the process of the invention the cations of accompanying metals which form a stronger bond, such as copper, nickel and indium, are preferentially absorbed by the ion exchanger, from a quantitive point of view, even when cadmium is present in a large excess. In the method of procedure described hereinafter, the use of the usual buffer solutions is also unnecessary.

The cadmium solution, e.g., a sulphate solution for cadmium electrolysis having a pH of between 1.5 and 5, preferably above 3, is passed in the conventional manner over an exchanger column.

The specific loading of the exchanger, i.e., the contact time of the cadmium solution in the column, if from 2 to 25 liters per hour per liter of resin volume, preferably from 4 to 10 liter/hour/liter. It depends upon the difference between the binding strength of cadmium and that of the cations which are to be removed, and when several metals are present it depends upon that metal whose relative binding stability is least compared with that of cadmium. The solution temperature for ion exchange is advantageously increased, preferably to from 60° to 80° C. Purification of the liquor by filtration of the solution over the exchanger column is terminated as soon as one of the accompanying metals which are to be removed appears in the discharge from the column or exceeds the permissible concentrations. The first metal to be detected in the outflow will be that which differs least from cadmium in its binding strength.

The cadmium solution treated in this way is free from the accompanying metals or at the most contains only milligram traces of the metal impurities.

The charged exchanger contains, in addition to cadmium, a highly increased concentration of the accompanying metals removed from the solution. The distribution ratio on the resin depends on the metal contents, the pH, the temperature and the anions of the starting solution.

After termination of the charging of the resin and up to the time when the metal impurity or impurities break through into the discharge, the resin is washed with water and is eluted by running a mineral acid through it. The accompanying metals are in this way obtained in the form of a highly concentrated solution.

The elution may be carried out with a dilute strong acid, the degree to which the extraction solution is concentrated being influenced by the concentration of the acid and the specific charge of the exchanger. If, for example, elution is carried out with a 3N hydrochloric acid solution at a specific charge of from 2 to 5 parts by volume per hour, the amount required will be from 2 to 2.5 parts by volume.

Substantial concentration of the accompanying metals in the middle fraction can be achieved by fractional sub-division of the eluate. Both the first runs and the last fraction contain small quantities of cadmium and the last fraction moreover has an increased acid content. This last fraction may, if desired, be used again after the next charge for fresh elution of the exchanger.

Since the ion exchangers of the process according to the invention operate in the weakly acid range, the $NH_4$, alkali metal or alkaline earth metal form of the resin is suitable for starting the process. The sodium or calcium form is preferably used at the start of the exchange reaction, or in some cases the cadmium form.

The complex forming cation exchangers used for the process according to the invention are of the type which carry ion exchange active aminocarboxylic acid and/or imino carboxylic acid groups:: the said carboxylic acids may have from one to five carbon atoms. It is particularly advantageous to use resins based on cross-linked polymers which have been synthesised by the copolymerisation of monomers having one or more olefinic double bonds, for example styrene on the one hand and divinylbenzene on the other, with introduction of aminocarboxylic acid and/or iminodicarboxylic acid groups. The cation exchangers of the type described preferably have iminodiacetic acid groups. If the said resins have a foam structure, which can be produced when manufacturing the resins, they also have excellent resistance to the continuous change from acid to alkali medium, with the consequent changes in volume, and to the effect of high temperatures.

The following examples serve to explain the process of the invention without limiting it.

EXAMPLE 1

A cadmium sulphate containing 60.2 grams of cadmium per liter and also, as metal impurities, 0.21 g/l of Cu, 0.21 g/l of Ni and 0.18 g/l of Co, is adjusted to pH 3.5 – 4.0 35 l of this solution are filtered at a temperature of 65° C. over a slim resin column containing 2½ liters of the exchanger in the sodium form of imino diacetic acid groups. The specific loading of the exchanger is 5 l and, in the second half, 3 l of the solution per hour for each l of exchanger resin.

The cadmium solution discharged from the column is free from Ni and Cu. Ni starts to escape into the discharge after about 15 l of solution have flown through, and reaches a concentration of from 11 to 12 mg/l after 35 l have passed through. The upper part of the exchanger resin shows the colors of the complex non-ferrous metal compounds.

The cadmium liquor treated over the exchanger resin contains an average of less than 1 mg/l of Cu and 5.5 mg/l of Ni whilst the Co content has been reduced to 75 mg/l.

After the resin column has been washed with water, elution is carried out with 6.0 l of a 2.5 N $H_2SO_4$ solution at 60° C. and a specific load of 3. The eluate is divided into three fractions. The first fraction of 1.0 l contains from 3 to 4 grams of cadmium per liter and is free from acid. The third fraction contains small amounts of the accompanying metals and also from 6 to 8 grams of cadmium per liter and has a high acid content, and can be used again for elution. The accompanying metals which have been removed are collected in the main fraction of 3.5 l and are present in increased concentration compared with Cd. This fraction contains 100 percent of the copper, 97.3 percent of the nickel, 57 percent of the cobalt and 9.8 percent of the cadmium present in the original solution.

EXAMPLE 2

Selective indium deposition by ion exchange on dicarboxylic acid resin in the sodium form was carried out for the purpose of removing indium from a cadmium sulphate liquor obtained by the wet chemical processing of the intermediate products of zinc recovery. The solution, containing 20 g of cadmium per liter and 1.45 g of indium per liter is adjusted to a pH of 2 and treated at 65° to 70° C. with a specific load of the exchanger column of from 2 to 3 l per hour per l of exchanger volume. Escape of indium into the solution discharged from the column starts after filtration of 20 parts by volume of solution on 1 part by volume of resin, the indium in the outflow being 1 mg/l. After 25 parts by volume of the filtrate, the indium content in the discharge from the column rises to 10 mg/l.

The column is then washed with water and thereafter eluted with from 2 to 3 parts by volume of 10 percent hydrochloric acid at 50° to 60° C. The indium content in the eluate discharged reaches a maximum of 45 g/l. The first 2 parts by volume of eluate for each volume of resin contain 18.1 g of indium per liter = 100 percent in addition to 3.1 g of cadmium per l = 1.2 percent of the original solution. The treated cadmium solution contains less than 1 mg of indium per liter.

EXAMPLE 3

A cadmium chloride solution containing 48.0 g of Cd per l, 0.4 g of Zn per l and 0.047 g of In per l is passed over a slim column of exchanger resin at a pH of 2.5 at a specific load of 4 parts by volume of solution per hour. The temperature of the solution is 65° C.

After filtration of 17 parts by volume of solution through 1 part by volume of exchanger resin, the discharge from the column is still free from indium whilst the zinc content in the filtrate has increased to 45 to 50 mg/l, and it contains an average of 21 mg/l.

After the column has been washed, it is eluted with 3N HCl. 1.6 parts by volume of eluate contain 100 percent In and 95 percent Zn of the original solution.

We claim:

1. A process for decreasing the contaminating metal content of an aqueous cadmium solution having a pH of between 1.5 and 5 and containing at least one contaminating metal selected from the group consisting of lead, cobalt, zinc, silver, nickel, iron, indium, copper and thallium, said process comprising contacting said aqueous cadmium solution with a cation exchange resin having aminocarboxylic acid or iminocarboxylic acid groups as the active exchange groups and in the form of the alkali metal, alkaline earth metal, ammonium or cadmium salt thereof and recovering effluent from said contact step.

2. The process of claim 1 wherein the cation exchange resin, following said contact, is eluted and the eluate is recovered.

3. The process of claim 1 wherein the carboxylic acid moiety of said active exchange groups contains from one to five carbon atoms.

4. The process of claim 1 wherein said cation exchange resin comprises a crosslinked polymer of a monomer having at least one olefinic double bond, said polymer having said aminocarboxylic or iminocarboxylic groups thereon as substituents.

5. The process of claim 1 wherein the temperature of said aqueous cadmium solution is from 60° to 80°C.

6. The process of claim 1 wherein each liter of cation exchange resin volume is contacted with from 2 to 25 liters of aqueous cadmium solution per hour.

7. The process of claim 1 wherein each liter of cation exchange resin volume is contacted with from 4 to 10 liters of aqueous cadmium solution per hour.

* * * * *